United States Patent
Magaki et al.

(10) Patent No.: US 10,053,835 B2
(45) Date of Patent: Aug. 21, 2018

(54) SHOVEL

(71) Applicant: SUMITOMO(S.H.I.) CONSTRUCTION MACHINERY CO., LTD., Tokyo (JP)

(72) Inventors: Hideto Magaki, Chiba (JP); Kiminori Sano, Chiba (JP); Ryuji Shiratani, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 15/629,927

(22) Filed: Jun. 22, 2017

(65) Prior Publication Data

US 2017/0292241 A1  Oct. 12, 2017

Related U.S. Application Data

(63) Continuation of application No. PCT/JP2015/082924, filed on Nov. 24, 2015.

(30) Foreign Application Priority Data

Dec. 26, 2014  (JP) .................. 2014-266378

(51) Int. Cl.
  *E02F 3/40* (2006.01)
  *E02F 9/22* (2006.01)
  (Continued)

(52) U.S. Cl.
  CPC ............... *E02F 3/40* (2013.01); *B60R 11/06* (2013.01); *E02F 3/963* (2013.01); *E02F 5/02* (2013.01); *E02F 3/00* (2013.01); *E02F 5/00* (2013.01)

(58) Field of Classification Search
  CPC ......... E02F 3/00; E02F 3/314; E02F 3/31963; E02F 3/51; E02F 3/5102; E02F 3/912075;
  (Continued)

(56) References Cited

U.S. PATENT DOCUMENTS 6,820,356 B2 * 11/2004 Naruse .................. E02F 9/2221
  37/348
8,606,448 B2 * 12/2013 Anders .................. E02F 9/2075
  180/65.285
(Continued)

FOREIGN PATENT DOCUMENTS

EP  3112539  1/2017
JP  H08-277543  10/1996
(Continued)

OTHER PUBLICATIONS

International Search Report for PCT/JP2015/082924 dated Feb. 16, 2016.

*Primary Examiner* — Robert E Pezzuto
(74) *Attorney, Agent, or Firm* — IPUSA, PLLC (57) ABSTRACT

A shovel includes an attachment including a working assembly, a diesel engine provided with a supercharger, an oil hydraulic pump connected to the diesel engine provided with the supercharger, and a controller that executes a preload boost function, wherein the preload boost function is for increasing boost pressure of the supercharger prior to increasing a hydraulic pressure load on the oil hydraulic pump, wherein a range accessible by a predetermined part of the attachment includes a partial range at which, upon the working assembly being operated, the preload boost function is to be executed and a partial range at which, upon the working assembly being operated, the preload boost function is not to be executed.

10 Claims, 8 Drawing Sheets

(51) Int. Cl.
*E02F 3/96* (2006.01)
*E02F 5/02* (2006.01)
*B60R 11/06* (2006.01)
*E02F 3/00* (2006.01)
*E02F 5/00* (2006.01)

(58) Field of Classification Search
CPC .......... E02F 3/912246; E02F 3/912296; E02F 3/912091; E02F 9/2095; E02F 9/2217; E02F 9/2235; B60L 11/02; B60K 6/12; B60K 6/48; B60R 11/06; B60W 10/30; B60W 20/10; F02D 11/107; F02D 29/00; F02D 31/001; F02D 31/002; F02D 41/021

USPC ......... 37/348, 411, 414; 172/2–11; 414/694; 701/22, 50, 102
See application file for complete search history.

(56) References Cited

U.S. PATENT DOCUMENTS

| | | | |
|---|---|---|---|
| 2011/0313608 A1* | 12/2011 | Izumi | B60L 1/20 701/22 |
| 2012/0089288 A1* | 4/2012 | Kawashima | B60K 6/485 701/22 |
| 2013/0006457 A1 | 1/2013 | Anders et al. | |
| 2013/0340429 A1* | 12/2013 | Desai | F01N 5/02 60/608 |
| 2014/0058607 A1 | 2/2014 | Magaki et al. | |
| 2014/0088839 A1 | 3/2014 | Magaki et al. | |
| 2015/0078872 A1 | 3/2015 | Magaki et al. | |

FOREIGN PATENT DOCUMENTS

| | | |
|---|---|---|
| JP | 2001-295674 | 10/2001 |
| JP | 2008-128107 | 6/2008 |
| JP | 2008-255941 | 10/2008 |
| WO | 2012/121252 | 9/2012 |
| WO | 2012/169558 | 12/2012 |

\* cited by examiner

FIG.8

SHOVEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/082924 filed on Nov. 24, 2015, designating the U.S., which claims priority based on Japanese Patent Application No. 2014-266378 filed on Dec. 26, 2014. The entire contents of each of the foregoing applications are incorporated herein by reference.

BACKGROUND

Technical Field

The present disclosure relates to a shovel in which a diesel engine provided with a supercharger is installed.

Description of Related Art

A shovel has been known such that, prior to increasing hydraulic pressure load on an oil hydraulic pump connected to a diesel engine provided with a supercharger, electric power generation by a power generator connected to the engine is performed. In the shovel, an electric power generation load is actively increased prior to increasing the hydraulic load so as to eventually increase a load on the engine and boost pressure, so that, even if the hydraulic pressure load rapidly increases after that, engine output can be smoothly increased while maintaining a number of revolutions of the engine to be approximately constant. Note that, in the following, a function for increasing the boost pressure by executing electric power generation, etc., by the power generator prior to increasing the hydraulic pressure load is referred to as a "preload boost function."

SUMMARY

According to an aspect of the present disclosure, there is provided a shovel. The shovel includes an attachment including a working assembly; a diesel engine provided with a supercharger; an oil hydraulic pump connected to the diesel engine provided with the supercharger; a controller that executes a preload boost function, wherein the preload boost function is for increasing boost pressure of the supercharger prior to increasing a hydraulic pressure load on the oil hydraulic pump. A range accessible by a predetermined part of the attachment includes a partial range at which, upon the working assembly being operated, the preload boost function is to be executed and a partial range at which, upon the working assembly being operated, the preload boost function is not to be executed.

DETAILED DESCRIPTION

If a rapid increase in a hydraulic load does not occur after executing a preload boost function, an increase in boost pressure by executing the preload boost function may be wasted.

Thus, it is desirable to provide a shovel that executes the preload boost function more efficiently.

According to an embodiment, a shovel is provided that executes the preload boost function more efficiently.

Figure 1:
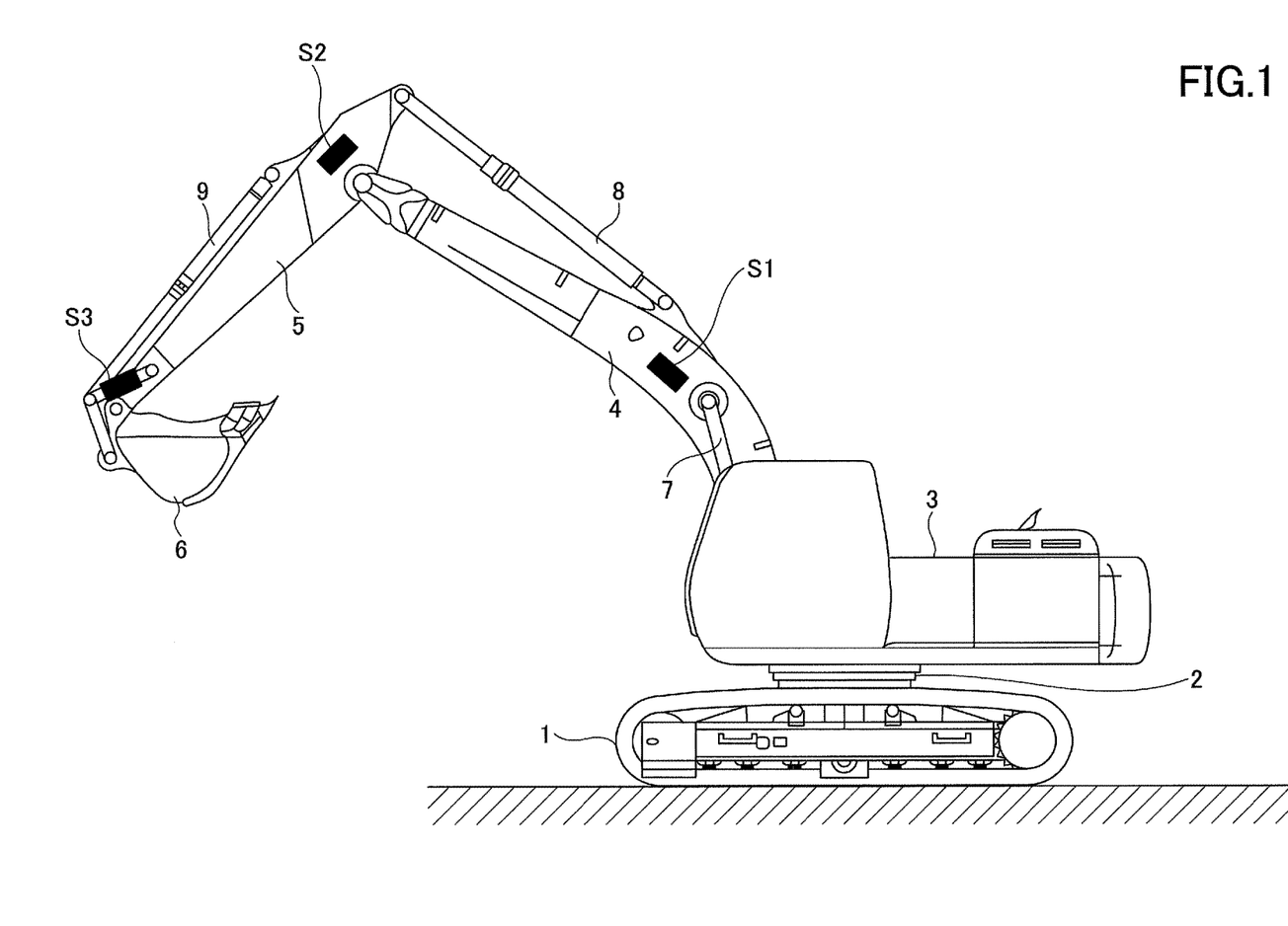
FIG. 1 is a side view of a shovel according to an embodiment of the present disclosure.

First, an overall configuration of a construction machine according to an embodiment of the present disclosure is described by referring to FIG. 1. Note that FIG. 1 is a side view showing a configuration example of a shovel, as the construction machine according to the embodiment of the present disclosure. However, the present disclosure is not limited to shovels and can be applied to another construction machine, provided that a diesel engine provided with a supercharger is installed in it.

An upper turning body 3 is installed in a lower traveling body 1 of the shovel, which is shown in FIG. 1, through a turning mechanism 2. A hinged boom 4, as a working assembly, is attached to the upper turning body 3. An arm 5, as a working assembly, is attached to a tip of the hinged boom 4; and a bucket 6, as a working assembly and as an end attachment, is attached to a tip of the arm 5. Note that the end attachment may be a breaker, a grapple, etc.

The hinged boom 4, the arm 5, and the bucket 6 form a back-hoe attachment, which is an example of the attachment; and these are respectively hydraulically driven by a boom cylinder 7, an arm cylinder 8, and a bucket cylinder 9. Furthermore, a boom angle sensor S1 is attached to the hinged boom 4; an arm angle sensor S2 is attached to the arm 5; and a bucket angle sensor S3 is attached to the bucket 6.

The boom angle sensor S1 is an example of an orientation detector for detecting an orientation of the back-hoe attachment; and it detects a rotation angle of the hinged boom 4. In this embodiment, it is a potentiometer for detecting a tilt angle of the hinged boom 4 with respect to the horizontal plane (which is referred to as the "boom angle," hereinafter). Specifically, the boom angle sensor S1 detects, as the boom angle, a rotational angle of the hinged boom 4 around a boom foot pin connecting the upper turning body 3 with the hinged boom 4.

The arm angle sensor S2 is an example of an orientation detector for detecting an orientation of the back-hoe attachment; and it detects a rotation angle of the arm 5. In the embodiment, it is a potentiometer for detecting a tilt angle of the arm 5 with respect to the horizontal plane (which is referred to as the "arm angle," hereinafter). Specifically, the arm angle sensor S2 detects, as the arm angle, a rotational angle of the arm 5 around an arm pin connecting the hinged boom 4 with the arm 5.

The bucket angle sensor S3 is an example of an orientation detector for detecting an orientation angle of the backhoe attachment; and it detects a rotation angle of the bucket 6. In the embodiment, it is a potentiometer for detecting a tilt angle of the bucket 6 with respect to the horizontal plane (which is referred to as the "bucket angle," hereinafter). Specifically, the bucket angle sensor S3 detects, as the bucket angle, a rotational angle of the bucket 6 around a bucket pin (an arm top pin) connecting the arm 5 with the bucket 6.

Note that, at least one of the boom angle sensor S1, the arm angle sensor S2, and the bucket angle sensor S3 may be an acceleration sensor, a stroke sensor for detecting a stroke amount of the corresponding hydraulic cylinder, a rotary encoder for detecting a rotational angle around a connecting pin, etc.

Figure 2:
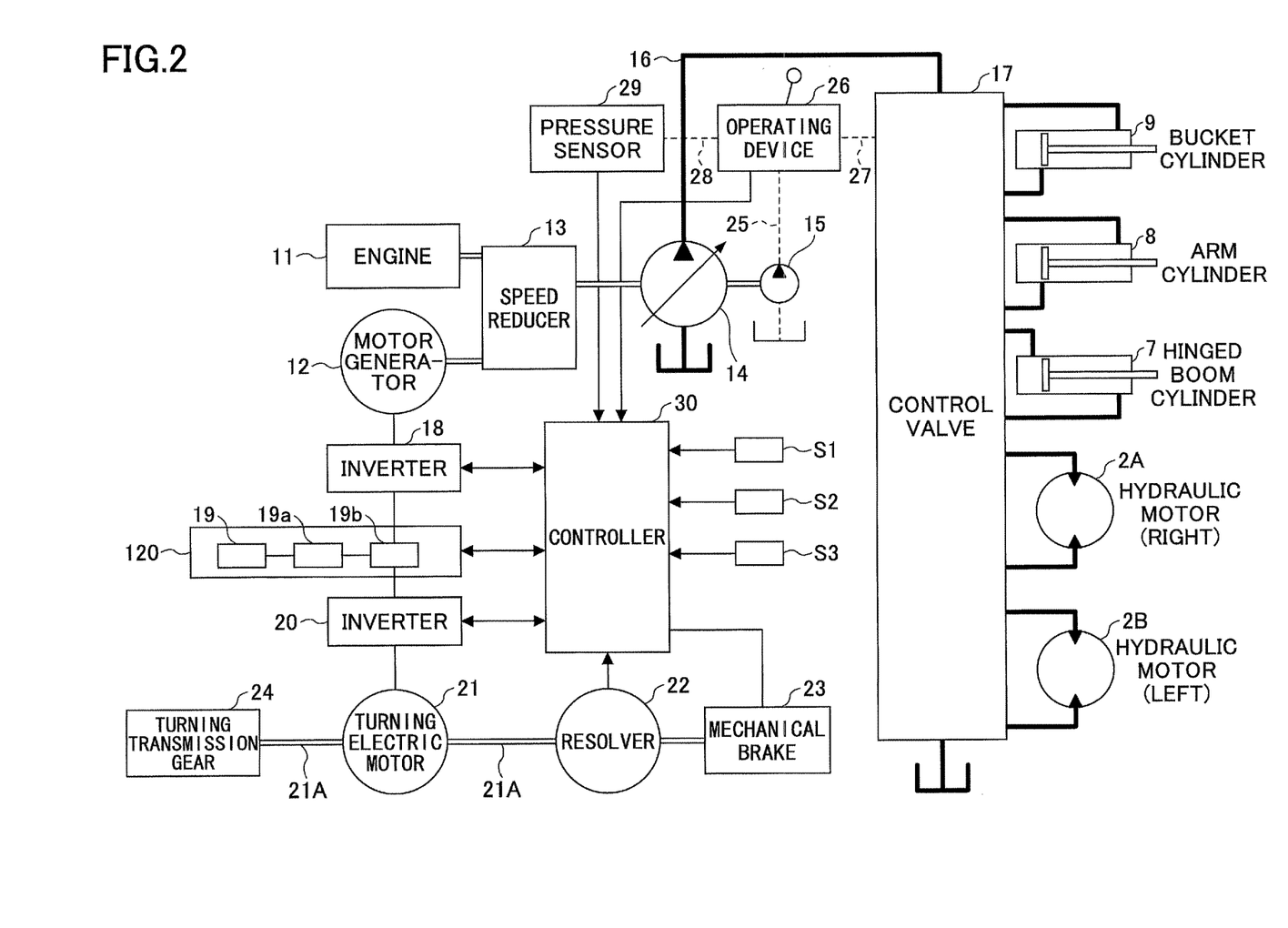
FIG. 2 is a diagram illustrating an example of a configuration of a drive system of the shovel of FIG. 1.

FIG. 2 is a diagram illustrating a configuration example of a drive system of the shovel shown in FIG. 1. In FIG. 2, a mechanical power system is indicated by a double line, a high-pressure hydraulic line is indicated by a thick solid line, a pilot line is indicated by a broken line, and an electric drive/control system is indicated by a thin solid line, respectively.

The engine 11 is a driving source of the shovel. In the embodiment, the engine 11 is a diesel engine provided with a turbocharger, as the supercharger, and a fuel injection device; and the engine 11 is mounted on the upper turning body 3. Note that the engine 11 may be provided with a mechanical super charger, as the supercharger. Furthermore, the engine 11 adopts isochronous control that maintains a number of revolutions of the engine to be constant, regardless an increase or decrease in the engine load.

The motor generator 12 is a device that functions as an electric motor and a generator. In the embodiment, the motor generator 12 functions as the electric motor that assists driving of the engine 11, and also functions as the generator that generates electric power using the driving force of the engine 11.

The engine 11 and the motor generator 12 are connected to two input shafts of a speed reducer 13, respectively. A main pump 14 and a pilot pump 15 are connected to an output shaft of the speed reducer 13. A control valve 17 is connected to the main pump 14 through a high pressure hydraulic line 16. Furthermore, an operating device 26 is connected to the pilot pump 15 through a pilot line 25.

The main pump 14 is a swash plate type variable displacement hydraulic pump that can vary a discharge amount (displacement volume) per revolution. The discharge amount per revolution is controlled by a pump regulator. A rotary shaft of the main pump 14 is connected to a rotary shaft of the engine 11 and rotates at rotation speed that is the same as rotation speed of the engine 11. Furthermore, the rotary shaft of the main pump 14 is connected to a flywheel. The reason is for regulating fluctuation of the rotation speed when engine output torque fluctuates.

The control valve 17 is a hydraulic control device for controlling a hydraulic system in the shovel. In the embodiment, the control valve 17 is connected to various hydraulic actuators, such as a right traveling hydraulic motor 2A, a left traveling hydraulic motor 2B, a boom cylinder 7, an arm cylinder 8, a bucket cylinder 9, etc., through a high pressure hydraulic line.

An inverter 18 controls operation of the motor generator 12. In the embodiment, the inverter 18 is provided between the motor generator 12 and a power storage device 120, and controls operation of the motor generator 12 based on a command from the controller 30. Specifically, when the inverter 18 controls the motor generator 12 as an electric motor, the inverter 18 supplies required electric power from the power storage device 120 to the motor generator 12. Furthermore, when the inverter 18 controls the motor generator 12 as a generator, the inverter 18 stores the electric power generated by the motor generator 12 in the power storage device 120.

An inverter 20 controls operation of a turning electric motor 21. In the embodiment, the inverter 20 is provided between the turning electric motor 21 and the power storage device 120, and controls operation of the turning electric motor 21 based on a command from the controller 30. Specifically, when the inverter 20 controls the turning motor 21 as an electric motor, the inverter 20 supplies required electric power from the power storage device 120 to the turning motor 21. Furthermore, when the inverter 20 controls the turning motor 21 as a generator, the inverter 20 stores the electric power generated by the turning motor 21 in the power storage device 120.

The turning electric motor 21 is a device for turning the upper turning body 3 with respect to the lower traveling body 1; and, similar to the motor generator 12, it functions as an electric motor and a generator. In the embodiment, the turning electric motor 21 functions as an electric motor for turning the upper turning body 3 and functions as a generator for generating electricity using a moment of inertia of the upper turning body 3. Note that a resolver 22, a mechanical brake 23, and a turning transmission gear 24 is connected to an output shaft 21A of the turning electric motor 21.

The power storage device 120 is disposed between the inverter 18 and the inverter 20. Consequently, when at least one of the motor generator 12 and the turning electric motor 21 functions as an electric motor, namely, when a power running operation is performed, it supplies electric power required for the power running operation. Furthermore, when at least one of them functions as a generator, namely, when a generating (regenerating) operation is performed, it accumulates electric power generated by the generating (regenerating) operation.

In the embodiment, the power storage device 120 includes a capacitor 19; a step-up/step-down converter 19a; and a DC bus 19b. The capacitor 19 is connected to the motor generator 12 through the step-up/step-down converter 19a, the DC bus 19b, and the inverter 18. Furthermore, the capacitor 19 is connected to the turning electric motor 21 through the the step-up/step-down converter 19a, the DC bus 19b, and the inverter 20. The step-up/step-down converter 19a is disposed between the capacitor 19 and the DC bus 19b, and performs control to switch between a step-up operation and a step-down operation, so that a voltage level of the DC bus 19b that fluctuates depending on operation states of the motor generator 12 and the turning electric motor 21 is to be within a certain range. The DC bus 19b is disposed between the step-up/step-down converter 19a and the inverters 18 and 20, and allows transmission and reception of electric power among the capacitor 19, the motor generator 12, and the turning electric motor 21.

The operating device 26 is a device for operating various hydraulic actuators. In the embodiment, the operating device 26 causes pilot pressure to be generated, which corresponds to details of an operation, such as an operation amount and an operation direction. Furthermore, the operating device 26 is connected to the control valve 17 through a hydraulic line 27. The control valve 17 moves spool valves (flow amount control valves) corresponding to various hydraulic actuators in accordance with the pilot pressure caused to be generated by the operating device 26, and supplies the hydraulic oil discharged from the main pump 14 to the various hydraulic actuators. Furthermore, the operating device 26 is connected to a pressure sensor 29 through a hydraulic line 28. The pressure sensor 29 converts the pilot pressure caused to be generated by the operating device 26 into an electric signal and outputs the converted electric signal to the controller 30.

The controller 30 is a control device that performs drive control of the shovel. In the embodiment, the controller 30 is a processing device including a CPU and a storage device. Specifically, the controller 30 implements various functions by executing, by the CPU, a program for drive control stored in the storage device. The various functions include a function for determining whether execution of the preload boost function is required.

Figure 3:
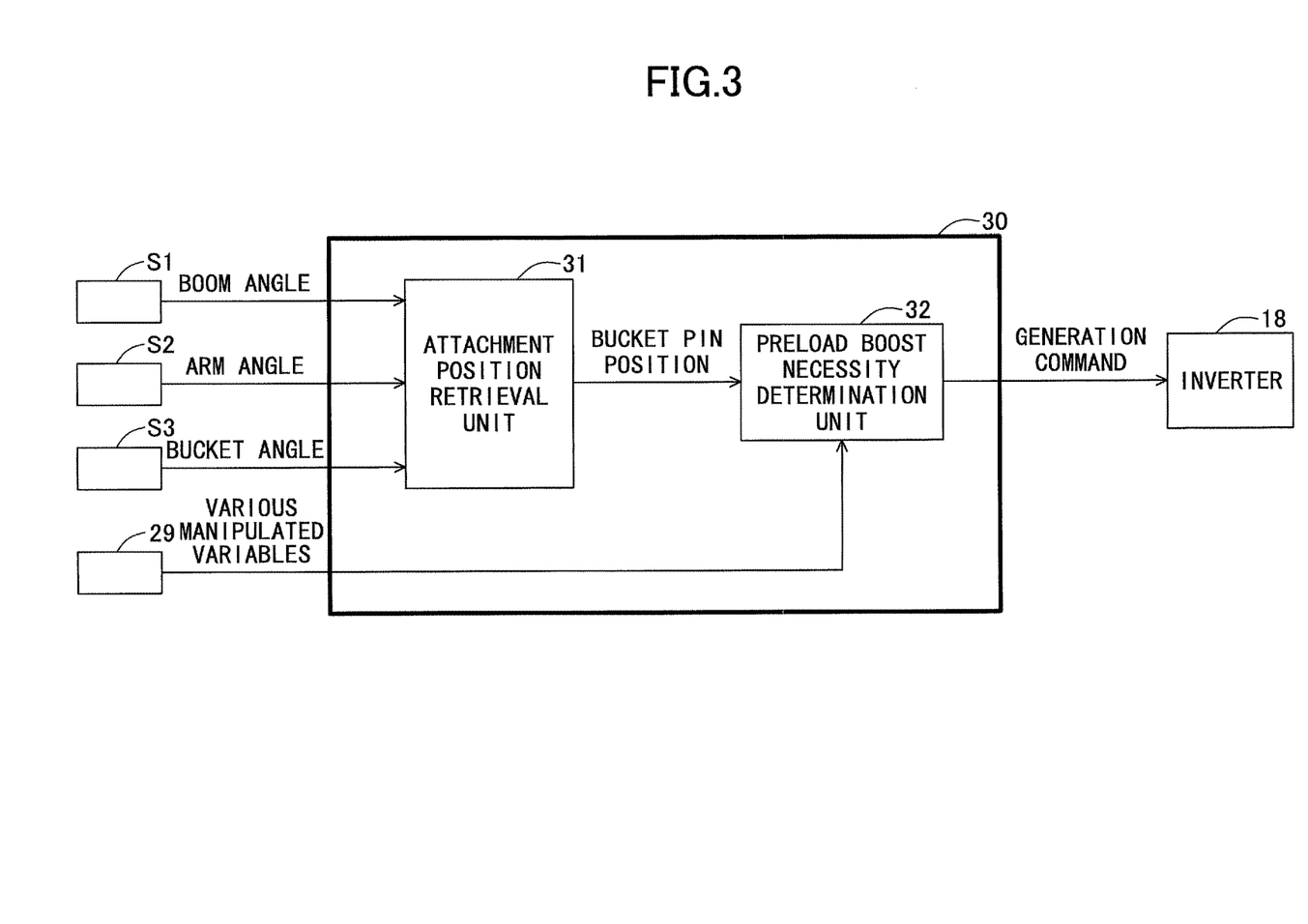
FIG. 3 is a functional block diagram illustrating an example of a configuration of a controller to be installed in the shovel of FIG. 1.

Next, by referring to FIG. 3, a function of the controller 30 is described, which is for determining whether execution of the preload boost function is required. Note that FIG. 3 is a functional block diagram of the controller 30, and it includes functional elements used for determining whether execution of the preload boost function is required. In the embodiment, the controller 30 mainly includes an attachment position retrieval unit 31 and a preload boost necessity determination unit 32.

The attachment position retrieval unit 31 is a functional element that retrieves positions of predetermined parts of the attachment. In the embodiment, the attachment position retrieval unit 31 derives an orientation of the back-hoe attachment based on detection values of the boom angle sensor S1, the arm angle sensor S2, and the bucket angle sensor S3, respectively. The object is to derive the positions of the respective points on the back-hoe attachment with respect to a reference position. Note that the respective points on the back-hoe attachment include the position of the bucket pin, the tip position of the bucket 6, etc. The reference position is a position that can be a basis for deriving the positions of the respective points on the back-hoe attachment; and the reference position is a point on a pivot, a front end position of a cabin, or a center position of a driver's seat, for example. In the embodiment, the reference position is the intersection of the pivot axis and the ground plane of the shovel.

Figure 4A:
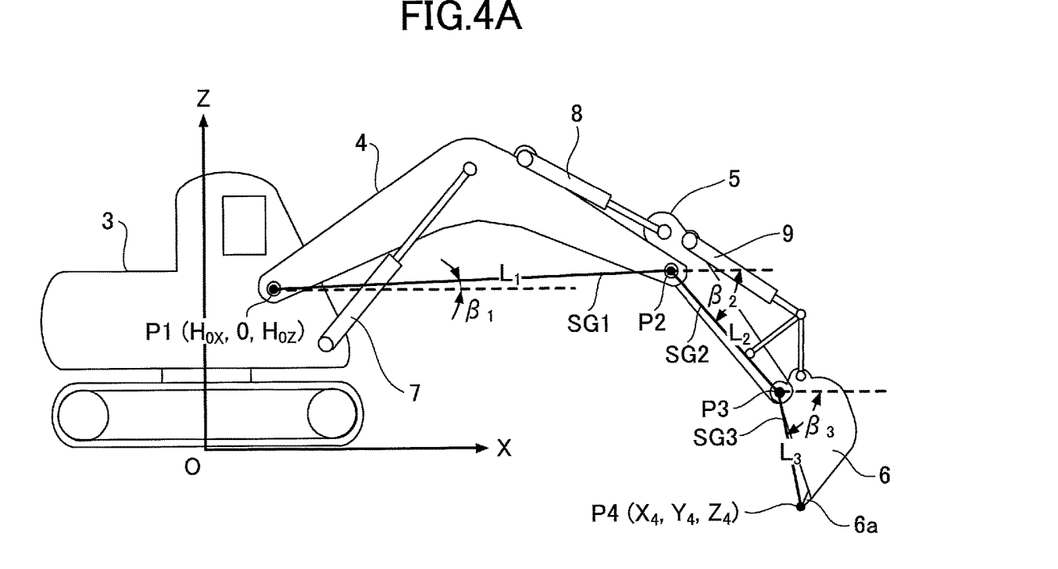
FIG. 4A is a diagram illustrating a process of deriving positions of respective points on a back-hoe attachment.
Figure 4B:
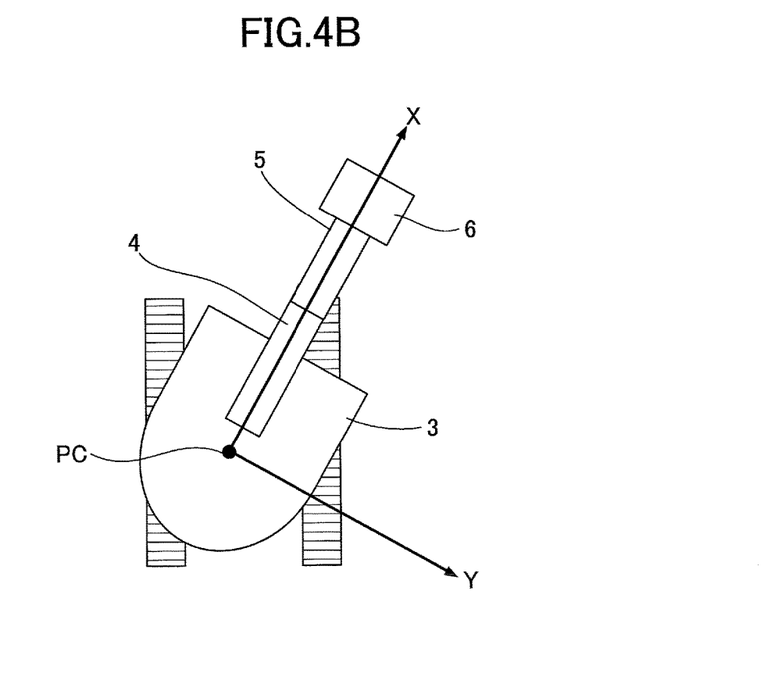
FIG. 4B is a diagram illustrating the process of deriving the positions of the respective points on the back-hoe attachment.

Here, by referring to FIG. 4A and FIG. 4B, a process is described that is for deriving the positions of the respective points on the back-hoe attachment by the attachment position retrieval unit 31. Note that FIG. 4A is a side view of the shovel, and FIG. 4B is a top view of the shovel.

As illustrated in FIG. 4A and FIG. 4B, the Z axis of the XYZ coordinate system, which is a three-dimensional orthogonal coordinate system, corresponds to the pivot axis of the shovel; and the origin "O" as the reference position corresponds to an intersection point between the pivot axis and the ground plane of the shovel.

Furthermore, the X-axis that is perpendicular to the Z axis extends in the extending direction of the back-hoe attachment; and, similarly, the Y axis that is perpendicular to the Z axis extends in the extending direction of the back-hoe attachment. Note that the X axis and the Y axis rotate around the Z axis, as the shovel turns.

Furthermore, as shown in FIG. 4A, the position at which the hinged boom 4 is attached to the upper turning body 3 is represented by a boom foot pin position P1, which is the position of the boom foot pin, as a boom rotation axis. Similarly, the position at which the arm 5 is attached to the hinged boom 4 is represented by an arm pin position P2, which is the position of the arm pin, as an arm rotation axis.

Furthermore, the position at which the bucket 6 is attached to the arm 5 is represented by a bucket pin position P3, which is the position of the bucket pin, as a bucket rotation axis. Furthermore, the tip position of a claw 6*a* of the bucket 6 is represented by the bucket tip position P4.

Furthermore, as the boom length, the length of a line segment SG1 connecting the boom foot pin position P1 and the arm pin position P2 is represented by a predetermined value $L_1$; as the arm length, the length of the line segment SG2 connecting the arm pin position P2 and the bucket pin position P3 is represented by a predetermined value $L_2$; and, as the bucket length, the length of the line segment SG3 connecting the bucket pin position P3 and the bucket tip position P4 is represented by $L_3$. Note that the predetermined values $L_1$, $L_2$, and $L_3$ are stored in advance in the storage device D4, etc.

Furthermore, a boom angle formed between the line segment SG1 and the horizontal plane is represented by $\beta_1$; an arm angle formed between the ling segment SG2 and the horizontal plane is represented by $\beta_2$; and a bucket angle formed between the line segment SG3 and the horizontal plane is represented by $\beta_3$. Note that, in FIG. 4A, for the boom angle $\beta_1$, the arm angle $\beta_2$, and the bucket angle $\beta_3$, the counterclockwise direction with respect to the line parallel to the X axis is defined to be the plus direction.

Here, if the three-dimensional coordinates of the boom foot pin position P1 are (X, Y, Z)=($H_{0X}$, 0, $H_{0Z}$), and the three-dimensional coordinates of the bucket tip position P4 are (X, Y, Z)=($X_4$, $Y_4$, $Z_4$), $X_4$ and $Z_4$ are represented by formula (1) and formula (2), respectively.

[Formula 1]

$$X_4 = H_{0X} + L_1 \cos \beta_1 + L_2 \cos \beta_2 + L_3 \cos \beta_3 \qquad (1)$$

[Formula 2]

$$Z_4 = H_{0Z} + L_1 \sin \beta_1 + L_2 \sin \beta_2 + L_3 \sin \beta_3 \qquad (2)$$

Note that $Y_4$ is 0. The reason is that the bucket tip position P4 exists on the XZ plane. Furthermore, the boom foot pin position P1 is invariant with respect to the origin O, so that, if the boom angle $\beta_1$ is determined, the coordinates of the arm pin position P2 are uniquely determined. Similarly, if the boom angle $\beta_1$ and the arm angle $\beta_2$ are determined, the coordinates of the bucket pin position P3 are uniquely determined; and, if the boom angle $\beta_1$, the arm angle $\beta_2$, and the bucket angle $\beta_3$ are determined, the coordinates of the bucket tip position P4 are uniquely determined.

In the embodiment, the attachment position retrieval unit 31 derives the coordinates of the bucket pin position P3 with respect to the origin O, which is the reference position, and outputs the coordinates to the preload boost necessity determination unit 32.

The preload boost necessity determination unit 32 is a functional element that determines whether execution of the preload boost function is required. In the embodiment, upon detecting that a boom raising operation is performed, the preload boost necessity determination unit 32 determines whether the preload boost function is to be executed based on the bucket pin position P3. Specifically, the preload boost function determination unit 32 determines whether a boom operation lever is operated toward the raising direction based on the output of the pressure sensor 29. Then, if it is determined that the boom operation lever is operated toward the raising direction, it is determined that the boom raising operation is performed. Note that, for example, upon detecting that the boom raising operation amount exceeds a predetermined value, the preload boost necessity determination unit 32 determines that the boom operation lever is operated toward the raising direction.

Upon determining that the boom raising operation is performed, the preload boost determination unit 32 determines whether the bucket pin position P3 output by the attachment position retrieval unit 31 is within a predetermined actual work range.

Then, upon determining that the bucket pin position P3 is within the actual work range, the preload boost necessity determination unit 32 determines that execution of the preload boos function is required. However, if it is determined that the bucket pin position P3 is not within the actual work range, the preload boost necessity determination unit 32 determines that the execution of the preload boost function is not required.

The "actual work range" is a range defined in the vicinity of the shovel. In the embodiment, the actual work range is defined as a partial range of a range that is accessible by the bucket pin position, which is the position of the predetermined part of the attachment. Furthermore, the information about the actual work range is stored in advance in the storage device, etc., of the controller 30. Note that the information about the actual work range may be adjustable through the input device, etc.

Figure 5:
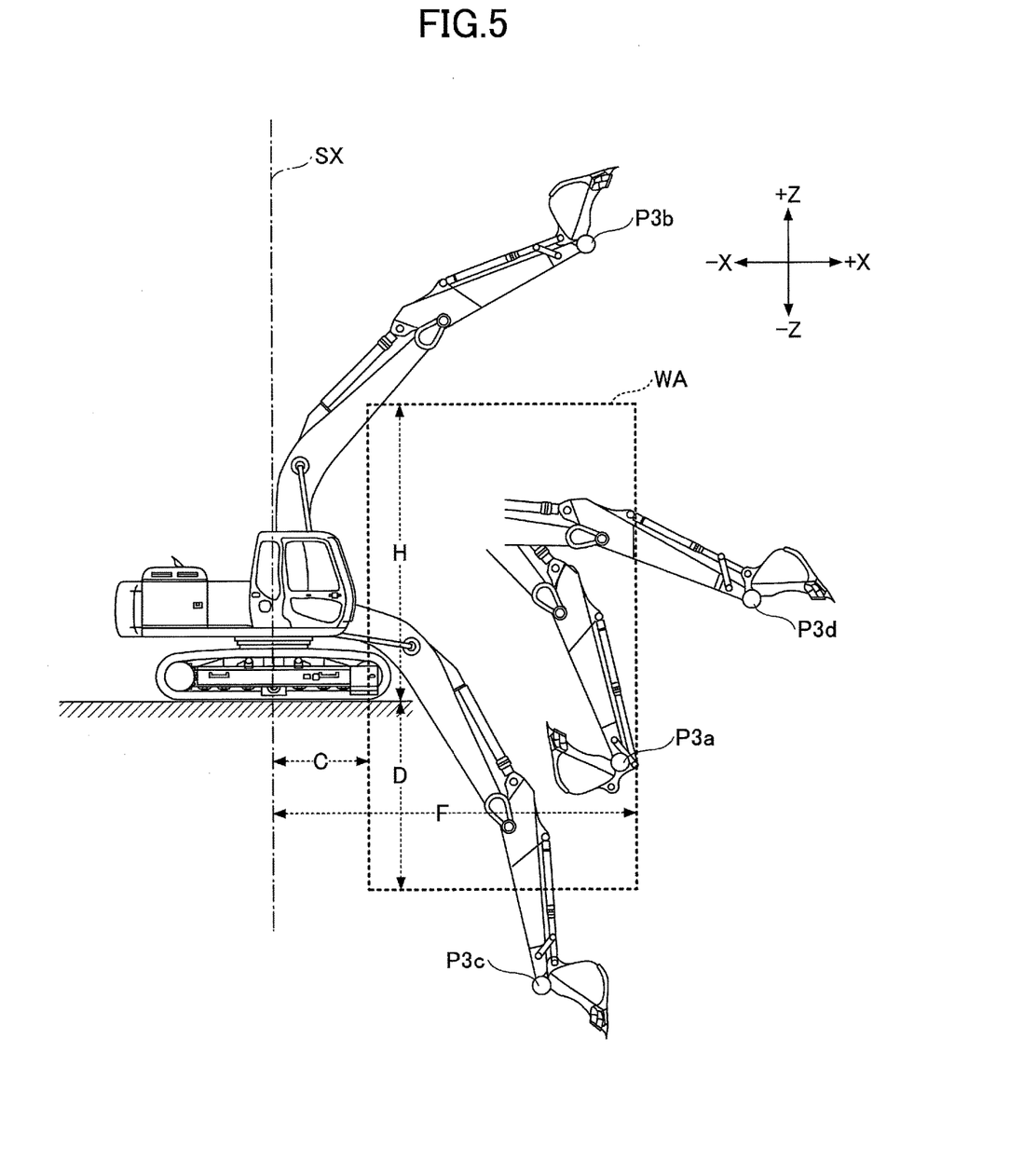
FIG. 5 is a side view of the shovel, which indicates an actual work range.

Here, an example of the actual work range is described by referring to FIG. 5. Note that FIG. 5 is a side view of the shovel, and it shows the actual work range WA defined in the XZ plane. The actual work range WA is partitioned by a lower limit line defined using a distance (depth) D ($\leq 0$) from the ground plane of the shovel, an upper limit line defined using a distance (height) H ($\geq 0$) from the ground plane of the shovel, a proximal limit line defined using a distance (proximity) C ($\geq 0$) from the pivot axis SX, and a distal side limit line defined using a distance (distance) F ($\geq C$) from the pivot axis SX. Note that the depth D is, for example, the maximum depth at which the bucket 6 can be visually recognized by an operator of the shovel in a state in which the operator is seated in the driver's seat. Furthermore, the information about the actual work area WA, such as the depth D, the height H, the proximity C, and the distance F, is stored in the storage device, etc., of the controller 30 in an adjustable state. Furthermore, the proximity C and the distance F may be defined while using, as a reference, a position other than the pivot axis SX, such as the cabin front end position and the driver's seat center position.

Upon detecting that the attachment position retrieval unit 31 derives the bucket pin position P3a, the preload boost necessity determination unit 32 determines that the bucket pin position is within the actual work area WA. Then, the preload boost necessity determination unit 32 determines that execution of the preload boost function is required, and outputs a power generation command to the inverter 18 so as to cause the motor generator 12 to execute short time power generation. The object is to actively increase the load on the engine 11. In this case, the boost pressure is increased prior to occurrence of a rapid increase in the hydraulic load due to a boom raising operation. As a result, even if the hydraulic load rapidly increases after that, the engine 11 can smoothly increase engine output while maintaining the number of revolutions to be approximately constant. The reason is that it is unlikely that the fuel injection amount is limited due to low boost pressure.

However, upon detecting that the attachment position retrieval unit 31 derives the bucket pin position P3b, P3c, or P3d, the preload boost necessity determination unit 32 determines that the bucket pin position is not within the actual work range. Then, the preload boost necessity determination unit 32 determines that execution of the preload boost function is not required, and does not output any power generation command to the inverter 18. The reason is that, if the bucket pin position is not within the actual work area WA, such as a case where the back-hoe attachment is largely extended, it is estimated that necessity for a rapid boom raising operation is low. For example, when the bucket 6 is in a deep position and a shovel operator may not visually recognize the bucket 6, it is estimated that the operator does not desire the quick boom raising operation. Furthermore, when the bucket 6 is located at a higher position and the operator may not visually recognize the bucket 6 with a natural posture, it is estimated that the operator does not desire the quick boom raising operation. Furthermore, when the bucket 6 is located at a far front position and an orientation of the shovel is unstable, it is estimated that the operator does not desire the quick boom raising operation. As a result, unnecessary execution of the preload boost function can be suppressed, and fuel consumption can be enhanced.

Furthermore, the preload boost necessity determination unit 32 may adjust boost pressure achieved by execution of the preload boost function by adjusting details of electric power generation by the motor generator 12 during execution of the preload boost function. For example, the preload boost necessity determination unit 32 may vary the power generation amount per unit time depending on the distance from the pivot axis SX to the bucket pin position (which is referred to as the "bucket pin distance," hereinafter). Specifically, by reducing the electric power generation amount per unit time as the bucket pin distance increases, the preload boost necessity determination unit 32 may reduce an absolute value of an increase in the boost pressure achieved by execution of the preload boost function, as the bucket pin distance increases. Namely, the absolute value of the active increase in the engine load achieved by execution of the preload boost function may be reduced.

Figure 6:
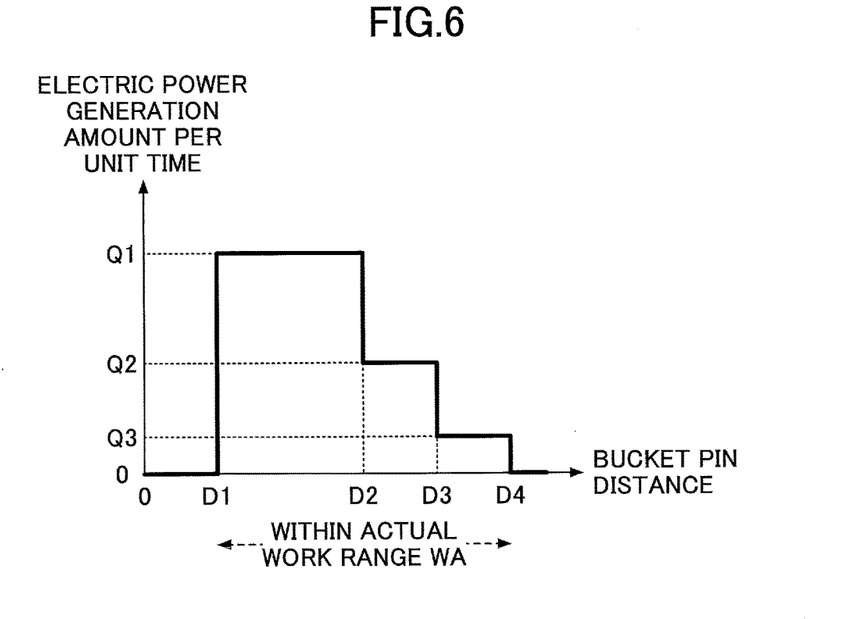
FIG. 6 is a diagram showing an example of a relation between a bucket pin distance and an electric power generation amount per unit time.

FIG. 6 is a diagram illustrating an example of a relation between the bucket pin distance and the electric power generation amount per unit time. As shown in FIG. 6, when the bucket pin position is within the actual work region WA, the preload boost necessity determination unit 32 reduces the electric power generation amount per unit time in a stepwise manner, as the bucket pin distance at the starting time of the boom raising operation becomes greater. Specifically, upon detecting that the bucket pin distance is greater than or equal to D1 and less than D2, the preload boost necessity determination unit 32 sets the electric power generation amount per unit time to Q1. Furthermore, when the bucket pin distance is greater than or equal to D2 and less than D3, the electric power generation amount per unit time is set to Q2 (<Q1); and when the bucket pin distance is greater than or equal to D3 and less than D4, the electric power generation amount per unit time is set to Q3 (<Q2). Note that, when the bucket pin distance is less than D1, or greater than or equal to D4, the bucket pin position is outside the actual work range WA, so that the electric power generation amount per unit time is 0.

In the above-described embodiment, the preload boost necessity determination unit 32 reduces the electric power generation amount per unit time in a stepwise manner, as the bucket pin distance becomes greater. However, the preload boost necessity determination unit 32 may linearly or non-linearly reduce the electric power generation amount per unit time, as the bucket pin distance becomes greater.

In the above-described embodiment, the preload boost necessity determination unit 32 reduces the electric power generation amount per unit time, as the bucket pin distance becomes greater. However, the preload boost necessity determination unit 32 may reduce the electric power generation amount per unit time, as the height of the bucket pin position with respect to the ground plane of the shovel becomes greater, or may reduce the electric power generation amount per unit time, as the depth of the bucket pin position with respect to the ground plane of the shovel becomes greater. Furthermore, as the reach of the attachment becomes longer, namely, as the back-hoe attachment is extended to be longer, the electric power generation amount per unit time may be reduced. As described above, when the preload boost function is executed, the preload boost necessity determination unit 32 may reduce the absolute value of the increase in the boost pressure achieved by execution of the preload boost function, as the bucket pin distance becomes greater; the height or the depth of the bucket pin position with respect to the ground plane of the shovel becomes greater; or the reach of the attachment becomes longer.

Furthermore, the preload boost necessity determination unit 32 may reduce the electric power generation amount per unit time, as the bucket pin position is separated from a reference range. Note that the reference range is, for example, a partial range of the actual work range WA such that the absolute value of the increase of the boost pressure achieved by execution of the preload boost function becomes the maximum. In the embodiment, it is a partial range of the actual work area WA at which the electric power generation amount per unit time achieved by execution of the preload boost function becomes the maximum. In the actual work range WA, for example, as the bucket pin position is separated from the reference range, namely, as it becomes closer to the boundary of the actual work range WA, the electric power generation amount per unit time becomes closer to zero; and, as the bucket pin position becomes closer to the reference range, namely, as it is separated from the boundary of the actual work range WA, the electric power generation amount per unit time becomes closer to the maximum value.

With this configuration, the controller 30 can suppress a sudden change in the details of the boom raising operation between the case where the bucket pin position is located at an inner side of the actual work range at a position closer to the boundary of the actual work range and the case where it is located outside.

Figure 7:
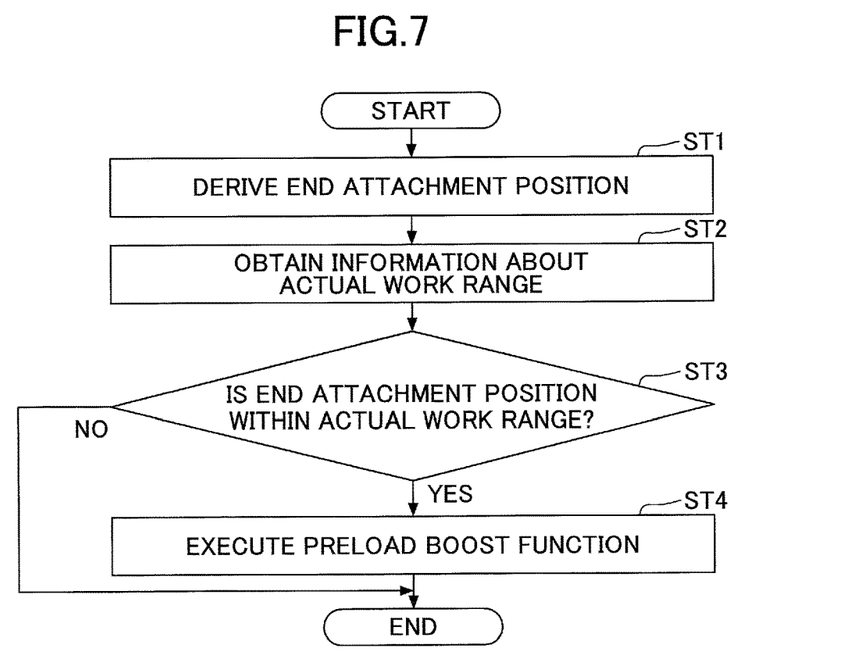
FIG. 7 is a flowchart illustrating an example of a flow of a preload boost necessity determination process.

Next, a process, by the controller 30, of determining whether execution of the preload boost function is required (which is referred to as a "preload boost necessity determination process," hereinafter) is described by referring to FIG. 7. Note that FIG. 7 is a flowchart showing an example of a flow of the preload boost necessity determination process. The controller 30 executes the preload boost necessity determination process each time the boom raising operation is started. In the embodiment, the controller 30 executes the preload boost necessity determination process each time the boom operation lever is operated from a neutral position toward the raising direction by a predetermined amount or more.

First, the controller 30 derives an end attachment position (step ST1). In the embodiment, the attachment position retrieval unit 31 of the controller 30 derives the bucket pin position, as the end attachment position, based on the output of the boom angle sensor S1 and the arm angle sensor S2.

Note that the end attachment position may be a position on the end attachment other than the position of the pin (e.g., the bucket pin position) connecting the end attachment (e.g., the bucket 6) and the arm 5.

Furthermore, the controller 30 obtains information about the actual work range (step ST2). In the embodiment, the preload boost necessity determination unit 32 of the controller 30 retrieves the information about the actual work range stored in the storage device, etc., of the controller 30. Specifically, the depth D, the height H, the proximity C, and the distance F that define the actual work range WA as shown in FIG. 5 are read out from the storage device. Note that step ST1 and step ST2 are in any order, and they may be simultaneously executed.

After that, the controller 30 determines whether the end attachment position is within the actual work range (step ST3). In the embodiment, the preload boost necessity determination unit 32 determines whether the bucket pin position is within the actual work range based on the information about the actual work range read out from the storage device and the bucket pin position derived by the attachment position retrieval unit 31.

Upon detecting that the bucket pin position, as the end attachment position, is not within the actual work range (NO at step ST3), the preload boost necessity determination unit 32 determines that execution of the preload boost function is not required, and terminates the preload boost necessity determination process for this time without executing the preload boost function.

However, upon detecting that the bucket pin position, as the end attachment position, is within the actual work range (YES at step ST3), the preload boost necessity determination unit 32 determines that execution of the preload boost function is required, and executes the preload boost function (step ST4). In the embodiment, the preload boost necessity determination unit 32 outputs a power generation command to the inverter 18, and causes the load on the engine 11 to be actively increased by starting short time electric power generation by the motor generator 12.

With this configuration, when the bucket pin position, as the end attachment position, is within the actual work range, the controller 30 causes the boost pressure to be increased prior to occurrence of a sudden increase in the hydraulic load caused by the boom raising operation. Consequently, even if the hydraulic load suddenly increases, the engine output can be smoothly increased while maintaining the number of revolutions of the engine 11 to be approximately constant, so that responsiveness with respect to the start of the boom raising operation can be enhanced.

Furthermore, when the bucket pin position, as the end attachment position, is not within the actual work range, the controller 30 does not cause the load on the engine 11 to be actively increased, even if the boom raising operation is started. Consequently, unnecessary enhancement of responsiveness with respect to the start of the boom raising operation can be prevented. Furthermore, electric power generation by the motor generator 12 is not started, so that an unnecessary increase in the fuel consumption amount can be prevented.

The preferred embodiment of the present disclosure is described above; however, the present disclosure is not limited to the above-described embodiment, and various modifications and substitutions may be added to the above-described embodiment without departing from the scope of the present disclosure.

For example, in the above-described embodiment, the preload boost necessity determination unit 32 determines whether execution of the preload boost function is required based on the position of the bucket pin. However, the present disclosure is not limited to this configuration. For example, the preload boost necessity determination unit 32 may determine whether execution of the preload boost function is required based on whether the arm pin position is within a predetermined corresponding actual work range. Alternatively, the preload boost necessity determination unit 32 may determine whether execution of the preload boost function is required based on whether the bucket tip position is within a predetermined corresponding actual work range.

Furthermore, in the above-described embodiment, the preload boost necessity determination unit 32 determines whether execution of the preload boost function is required when the boom raising operation is performed. However, the present disclosure is not limited to this configuration. For example, the preload boost necessity determination unit 32 may determine whether execution of the preload boost function is required when an operation other than the boom raising operation, such as a boom lowering operation and an arm closing operation, is performed. In this case, the "various operation amounts" that are outputs of the pressure sensor 29 of FIG. 3 include operation amounts of the boom operation lever, the arm operation lever, the bucket operation lever, etc.

Furthermore, in the above-described embodiment, upon detecting that the bucket pin position P3 is within the actual work range, the preload boost necessity determination unit 32 determines that execution of the preload boost function is required. However, the present disclosure is not limited to this configuration. For example, upon detecting that the bucket pin position P3 is within a non-actual work range, the preload boost necessity determination unit 32 may determine that execution of the preload boost function is not required. Similar to the "actual work range," the "non-actual work range" is defined to be a partial range of a range accessible by the bucket pin position, which is defined in the vicinity of the shovel. In principle, the actual work range is located closer to the shovel compared to the non-actual work range. Furthermore, information about the non-actual work range may be stored, in advance, in the storage device, etc., of the controller 30, and it may be adjustable through the input device, etc. Furthermore, when the non-actual work range is defined, the definition of the actual work range is omitted. The reason is that the non-actual work area and the actual work area have a complementary relationship. Furthermore, the non-actual work range may be adjacent to at least one of an upper part, a lower part, and a distant part of the actual work range when it is viewed from the shovel. In the embodiment, as shown in FIG. 5, the non-actual work range is adjacent to the upper part (+Z direction in FIG. 5), the lower part (−Z direction), and the distant part (+X direction) of the actual work range WA. Furthermore, a partial range closer to the pivot axis SX compared to the actual work range may be the non-actual work range. The reason is that, when the bucket 6 is, for example, in front of the cabin in a state where the arm 5 is fully closed, it can be estimated that necessity for a quick boom raising operation is low.

Furthermore, a plurality of actual work areas may be defined. For example, a first actual work range for causing a first preload boost function, which achieves relatively high boost pressure, to be executed, and a second actual work range for causing a second preload boost function, which achieves relatively low boost pressure, may be defined. In this case, the preload boost necessity determination unit 32 determines, upon detecting that the bucket pin position P3 is within the first actual work range, that execution of the first preload boost function is required, and determines, upon detecting that the bucket pin position P3 is within the second actual work range, that execution of the second preload boost function is required.

Furthermore, in the above-described embodiment, the actual work range is defined as a rectangular range; however, it may be defined using a curve.

Furthermore, in the above-described embodiment, the preload boost function causes the load on the engine 11 and, eventually, the boost pressure to be actively increased by executing short time electric power generation by the motor generator 12 prior to increasing the hydraulic load. However, the present disclosure is not limited to this configuration.

For example, when the supercharger of the engine 11 is a variable nozzle turbo, the preload boost function may cause the boost pressure to be actively increased by temporarily decreasing the nozzle opening of the nozzle vane that controls the flow amount of the exhaust gas flowing from the exhaust port of the engine 11 to the turbine blade prior to increasing the hydraulic load. Specifically, the boost pressure may be caused to be actively increased by increasing the rotational speed of the turbine blade and, eventually, the rotational speed of the compressor blade by reducing the nozzle opening of the nozzle vane.

Alternatively, the preload boost function may cause the load on the engine 11 and, eventually, the boost pressure to be actively increased by temporarily increasing the discharge amount of the main pump 14 prior to increasing the hydraulic load. Specifically, the load on the engine 11 and, eventually, the boost pressure may be caused to be actively increased by driving the main pump 14 with a predetermined discharge amount larger than a discharge amount (the discharge amount corresponding to the lever operation amount) determined using various flow amount control methods, such as a negative control method, a positive control method, and a load sensing control method.

Alternatively, the preload boost function may cause the load on the engine 11 and, eventually, the boost pressure to be actively increased by temporarily increasing the discharge amount of another hydraulic pump connected to the engine 11 prior to increasing the hydraulic load. Specifically, the load on the engine 11 and, eventually, the boost pressure may be caused to be actively increased by increasing the discharge amount of another hydraulic pump having higher responsiveness compared to the main pump 14. Note that the hydraulic oil discharged by the other hydraulic pump may be directly discharged to the hydraulic oil tank.

Alternatively, the preload boost function may cause the load on the engine 11 and, eventually, the boost pressure to be actively increased by temporarily increasing the discharge pressure of the main pump 14 prior to increasing the hydraulic load. Specifically, the load on the engine 11 and, eventually, the boost pressure may be caused to be actively increased by increasing the discharge pressure of the main pump 14 by controlling the relief valve, the switching valve, etc., that are disposed on the discharge side of the main pump 14. Alternatively, the load on the engine 11 and, eventually, the boost pressure may be caused to be actively increased by increasing the discharge pressure of the main pump 14 by supplying the hydraulic oil accumulated in an accumulator to the discharge side of the main pump 14.

Figure 8:
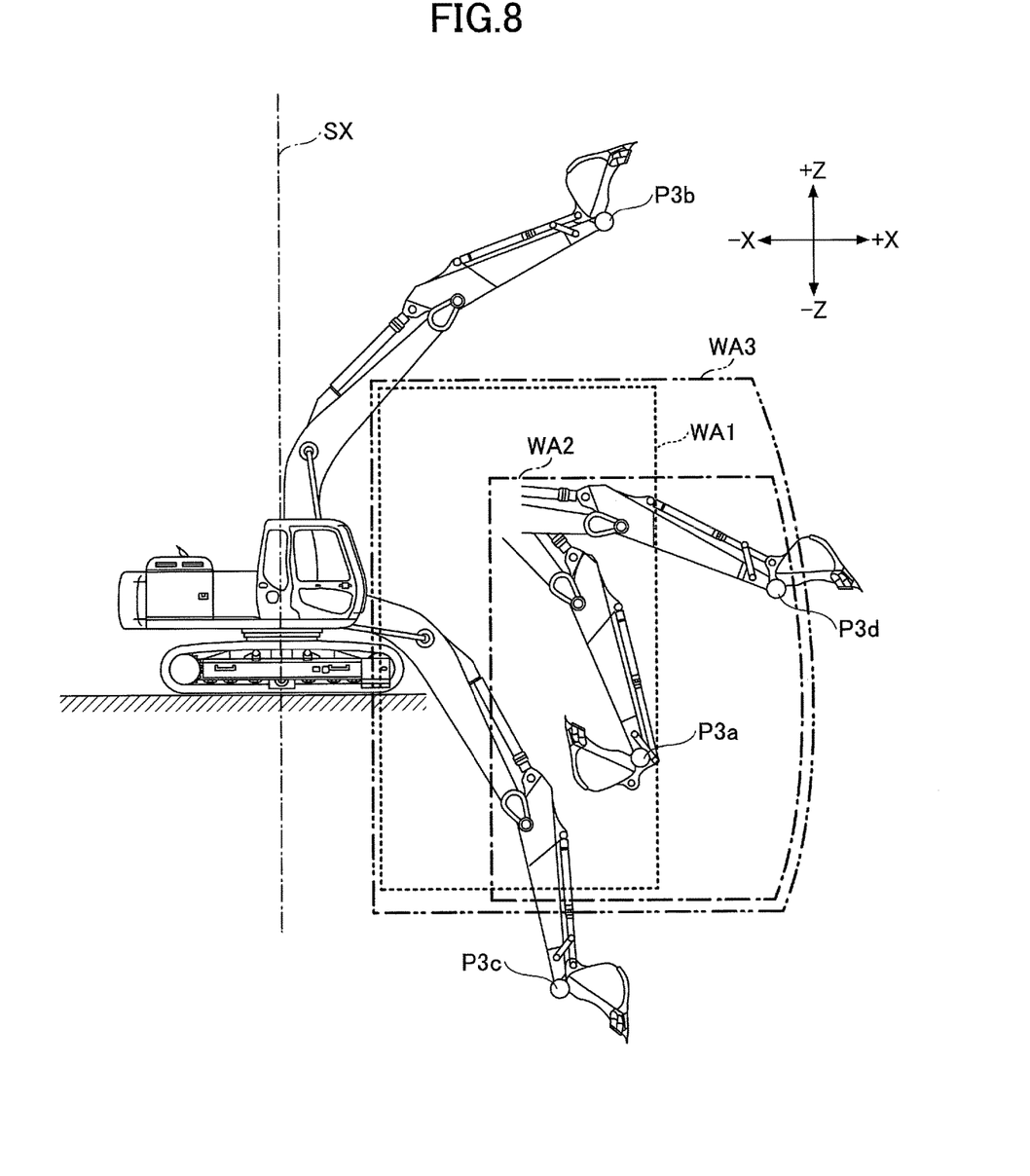
FIG. 8 is a side view of the shovel indicating an actual work range.

Next, another example of the actual work range is described by referring to FIG. 8. FIG. 8 is a side view of the shovel, and an actual work range WA1, an actual work range WA2, and an actual work range WA3 are shown, which are defined on the XZ plane. The actual work range WA1 surrounded by a dotted line is a range that is to be referred to by the preload boost necessity determination unit 32 for determining whether the preload boost function is to be executed when the boom raising operation is perform, and it corresponds to the actual work range WA of FIG. 5. The actual work range WA2 surrounded by a one dot chain line is a range that is to be referred to by the preload boost necessity determination unit 32 for determining whether the preload boost function is to be executed when the arm closing operation is performed. The actual work range WA3 surrounded by a two-dot chain line is a range to be referred to by the preload boost necessity determination unit 32 for determining whether the preload boost function is to be executed when the bucket closing operation is performed.

In the embodiment, the actual work range WA2 is defined at a position that is more separated from the pivot axis SX compared to the actual work range WA1. Consequently, upon detecting that the arm closing operation is performed and the attachment position retrieval unit 31 derives the bucket pin position P3d, the preload boost necessity determination unit 32 provides a determination result that is different from the determination result when the boom raising operation is performed. Namely, it is determined that the bucket pin position is within the actual work range WA2, and it is determined that execution of the preload boost function is required.

Furthermore, the actual work range WA3 is defined to include the actual work range WA1 and the actual work range WA2. Consequently, when the bucket closing operation is performed, the preload boost necessity determination unit 32 may provide a determination result that is different from a determination result when the boom raising operation or the arm closing operation is performed. Namely, when it is determined that the bucket pin position is not within any of the actual work range WA1 and the actual work range WA2, it may be determined that the bucket pin position is within the actual work range WA3, and it may be determined that execution of the preload boost function is required. For example, the actual work range WA3 may be defined as a range including the bucket pin position P3c, so that preload boost is executed when the bucket closing operation is performed during deep digging excavation. In this case, upon detecting that the attachment position retrieval unit 31 derives the bucket pin position P3c, the preload boost necessity determination unit 32 determines that execution of the preload boost function is required.

Figure 9:
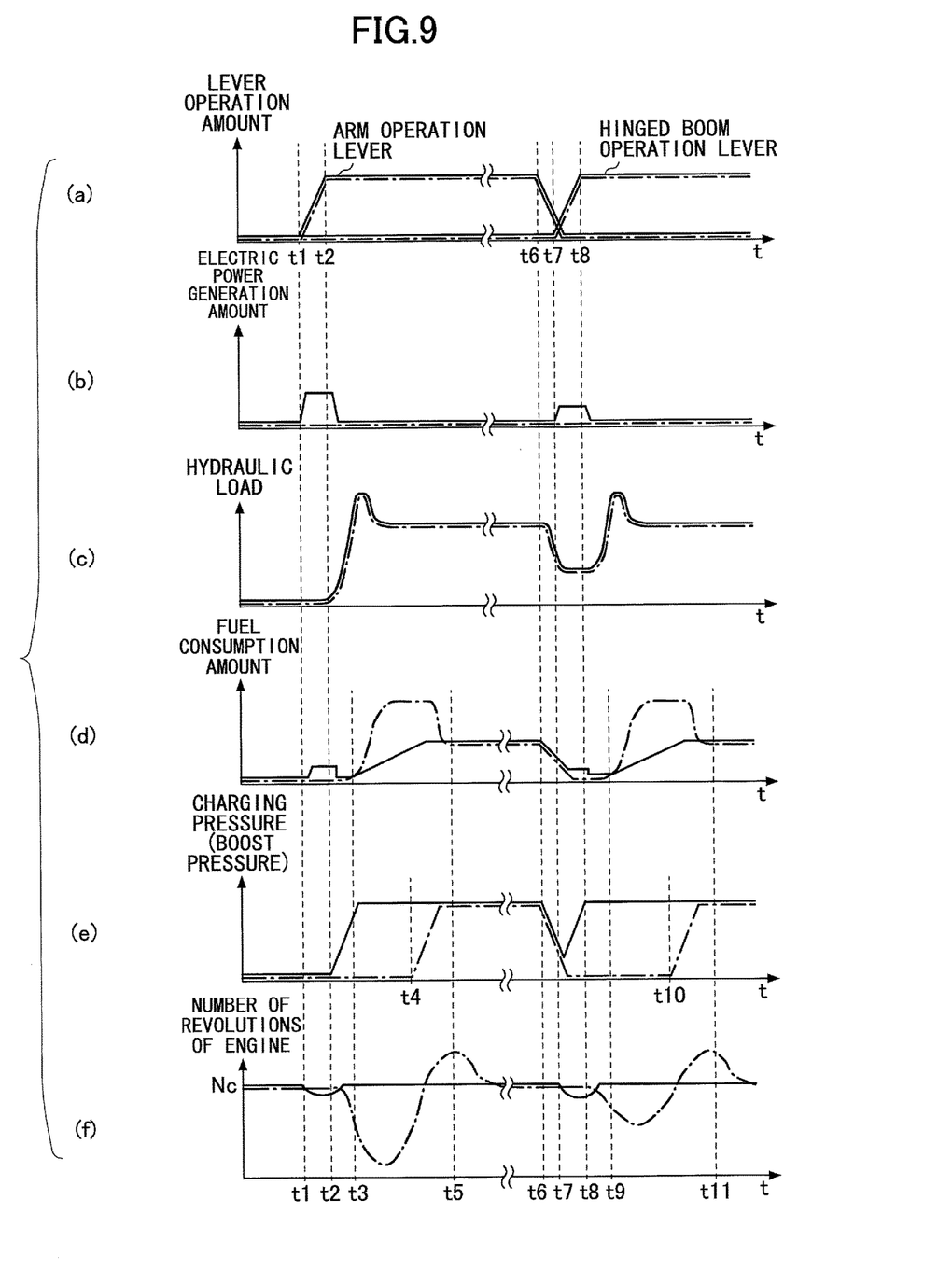
FIG. 9 is a time chart showing a temporal transition of a lever operation amount, a power generation amount, a hydraulic load, a fuel consumption amount, boost pressure, and a number of revolutions of an engine.

Next, by referring to FIG. 9, the temporal transitions of a plurality of physical quantities are described when a combined operation including the arm closing operation and the bucket closing operation is performed and, then, the boom raising operation is performed. FIG. 9 (a) through FIG. 9 (f) are time charts showing temporal transitions of the lever operation amount, the electric power generation amount, the hydraulic load, the fuel consumption amount, the boost pressure, and the number of revolutions of the engine, respectively. The solid line in FIG. 9 indicates the temporal transitions of respective physical quantities when the preload boost is executed; and the one dot chain line indicates the temporal transitions of respective physical quantities when the preload boost is not executed. For clarity, FIG. 9 shows the solid line and the one dot chain line, so that they do not overlap each other. However, the portion where the solid line and the one dot chain line are parallel means that they follow the same trajectory.

As shown in FIG. 9 (a), the shovel operator operates the arm operating lever toward the closing direction at time t1, operates it toward the neutral direction at time t6, and operates the boom operating lever toward the raising direction at time t7. Furthermore, the operator operates the bucket operating lever toward the closing direction after starting the operation of the arm operating lever toward the closing direction, and returns the bucket operating lever to the neutral position at a timing that is almost the same as the timing at which the arm operating lever is returned to the neutral position. Note that, for clarity, depiction of the transition of the lever operating amount of the bucket operating lever is omitted in FIG. 9 (a).

First, referring to the transitions indicated by the one dot chain line, the changes in the respective physical quantities are described when the preload boost is not performed.

When the arm closing operation is started at the time t1, the lever operation amount of the arm operating lever (e.g., the lever operation angle) increases from the time t1 to the time t2. Then, at the time t2, the lever operation amount reaches the maximum value.

As shown in FIG. 9 (c), the hydraulic load on the main pump 14 increases, as the discharge pressure of the main pump 14 increases in response to an increase in the excavation reaction force acting on the arm 5. The engine load also increases with the increase in the hydraulic load. As a result, as indicated by the one dot chain line in FIG. 9 (f), the number of revolutions of the engine significantly decreases on and after passing the time t2.

Upon detecting that the engine load increases and the number of revolutions of the engine deviates from the predetermined number of revolutions Nc, the controller 30 causes the fuel injection amount of the engine 11 to increase. As a result, as indicated by the one dot chain line in FIG. 9 (d), the fuel consumption amount of the engine 11 increases at time t3. After the fuel injection amount increases, a short time later, the number of revolutions of the engine starts to increase as indicated by the one dot chain line in FIG. 9 (f).

When the number of revolutions of the engine starts to increase, the boost pressure starts to increase at the time t4, as indicated by the one dot chain line in FIG. 9 (e). As a result, the controller 30 can enhance the combustion efficiency of the engine 11 and efficiently increase the output of the engine 11.

After that, the controller 30 attempts to maintain the number of revolutions of the engine to be the predetermined number of revolutions Nc by the isochronous control. However, the fuel consumption amount is increased, so that the number of revolutions of the engine does not stabilize immediately after reaching the predetermined number of revolutions Nc, and continues to increase beyond the predetermined number of revolutions Nc. After the fuel consumption amount decreases, a short time later, the increase in the number of revolutions of the engine stops, and the number of revolutions of the engine starts to decrease at the time t5. In this manner, the number of revolutions of the engine changes with a delay with respect to the change in the fuel injection amount. Consequently, even if, upon detecting that the number of revolutions of the engine reaches the predetermined number of revolutions Nc, the increase in the fuel injection amount is stopped, the number of revolutions of the engine exceeds and overshoots the predetermined number of revolutions Nc.

After that, at the time t6, the operator starts returning the arm operating lever to the neutral position so as to stop the closing operation of the arm 5. As a result, the excavation reaction force decreases, and the hydraulic load on the main pump 14 decreases as shown in FIG. 9 (c). As the hydraulic load decreases, the engine load also decreases, so that the fuel consumption amount also decreases as shown in FIG. 9 (*d*), and the boost pressure also decreases as shown in FIG. 9 (*e*).

After that, at the time t7, the operator operates the boom operating lever toward the raising direction so as to perform the raising operation of the boom 4. The lever operation amount of the boom operating lever starts to increase at the time t7 and reaches the maximum value at the time t8, as shown in FIG. 9 (*a*).

After passing the time t7, a short time later, the hydraulic load, which has decreased after the operation of the arm 5 has stopped, starts to increase again for the operation of the boom 4. Specifically, the discharge pressure of the main pump 14 increases due to the load applied to the boom 4, and the hydraulic load on the main pump 14 starts to increase on and after passing the time t8, as shown in FIG. 9 (*c*). The engine load increases together with the hydraulic load. As a result, as indicated by the one dot chain line in FIG. 9 (*f*), the number of revolutions of the engine starts to decrease from around the time t8.

Upon detecting that the engine load increases and the number of revolutions of the engine deviates from the predetermined number of revolution Nc, the controller 30 causes the fuel injection amount of the engine 11 to increase. As a result, as indicated by the one dot chain line in FIG. 9 (*d*), the fuel consumption amount of the engine 11 increases at the time t9. After the fuel injection amount increases, a short time later, the number of revolutions of the engine starts to increase, as indicated by the one dot chain line in FIG. 9 (*f*).

After the number of revolution of the engine starts to increase, as indicated by the one dot chain line in FIG. 9 (*e*), the boost pressure starts to increase at the time t10. As a result, the controller 30 can enhance the combustion efficiency of the engine 11 and efficiently increase the output of the engine 11.

After that, the controller 30 attempts to maintain the number of revolutions of the engine to be the predetermined number of revolutions Nc by the isochronous control. However, the fuel consumption amount is increased, so that the number of revolutions of the engine does not stabilize immediately after reaching the predetermined number of revolutions Nc, and continues to increase beyond the predetermined number of revolutions Nc. After the fuel consumption amount decreases, a short time later, the increase in the number of revolutions of the engine stops, and the number of revolutions of the engine starts to decrease at the time t11. In this manner, the number of revolutions of the engine changes with a delay with respect to the change in the fuel injection amount. Consequently, even if, upon detecting that the number of revolutions of the engine reaches the predetermined number of revolutions Nc, the increase in the fuel injection amount is stopped, the number of revolutions of the engine exceeds and overshoots the predetermined number of revolutions Nc.

As described above, when the preload boost is not executed, the number of revolutions of the engine significantly decreases as the hydraulic load increases, and the fuel consumption amount significantly increases in order to recover it.

Thus, in the embodiment, preload boost is executed to suppress a decrease in the number of revolutions of the engine and reduce the fuel consumption amount used for recovering the number of revolutions of the engine as much as possible.

Specifically, upon detecting that the arm operating lever is operated at the time t1, the preload boost necessity determination unit 32 determines whether the bucket pin position P3 output from the attachment position retrieval unit 31 is within the actual work range WA2 (cf. FIG. 8).

Then, upon detecting that the bucket pin position P3 is within the actual work range WA2, the preload boost necessity determination unit 32 determines that execution of the preload boost function is required, and immediately causes the motor generator 12 to perform a power generation operation. The time interval for causing the motor generator 12 to perform the power generation operation may be a short time interval, such as approximately 0.1 seconds. The motor generator 12 is driven by the engine 11 to perform the power generation operation, so that a load is applied to the engine 11 due to the power generation operation. As a result, as indicated by the solid line in FIG. 9 (*f*), the number of revolutions of the engine starts to decrease from the time t1.

Upon detecting that the number of revolutions of the engine starts to decrease, the controller 30 increases the fuel injection amount by the isochronous control to increase the number of revolutions of the engine. However, the timer interval for causing the motor generator 12 to perform the power generation operation is a short time interval, the power generation amount is set to be small, and the fuel injection amount is immediately increased. Consequently, though the number of revolutions of the engine starts to decrease at the time t1 as indicated by the solid line in FIG. 9 (*f*), it immediately starts to increase and returns to the predetermined number of revolutions Nc again. The number of revolutions of the engine returns to the predetermined number of revolutions Nc, so that the increased fuel consumption amount also returns to the original amount, as indicated by the solid line in FIG. 9 (*d*).

In this manner, the controller 30 causes the motor generator 12 to perform the power generation operation for a short time interval in response to the closing operation of the arm operating lever so as to apply the load to the engine 11. As a result, as indicated by the solid line in FIG. 9 (*e*), it is possible to start increasing the boost pressure at the time t2, at which the hydraulic load starts to increase. Namely, an increase in the hydraulic load on the main pump 14 is predicted based on the lever operation amount of the arm operating lever so as to cause the motor generator 12 to perform the power generation operation. In this manner, prior to actually increasing the hydraulic load, the power generation load on the motor generator 12 can be increased so as to apply the load to the engine 11. The reason for applying the load to the engine 11 is to increase, in advance, the boost pressure of the engine 11 prior to the increase in the hydraulic load, so that an increase in the engine load caused by the increase in the hydraulic load can be quickly responded.

After the time t2, the hydraulic load increases and the engine load also increases. Then, at the time t3, the controller 30 outputs a command for increasing the fuel injection amount. As a result, as shown in FIG. 9 (*d*), the fuel consumption amount gradually increases. The increased amount of the fuel consumption amount at this time corresponds to the increase in the hydraulic load. The number of revolutions of the engine has already reached the predetermined number of revolution Nc, so that it is not necessary to consume the fuel to increase the number of revolutions of the engine. At time t3, the boost pressure has already increased to the predetermined value, so that, even if the hydraulic load increases, the engine 11 can efficiently increase the output, and an increase in the fuel consumption amount can be suppressed. This effect is indicated as a difference between the one dot chain line (the transition when the preload boost is not executed) and the solid line (the transition when the preload boost is executed) from the time t3 to the time t5 in FIG. 9 (*d*).

After that, at the time t6, the operator starts to return the arm operating lever to the neutral position so as to stop the closing operation of the arm 5. As a result, the excavation reaction force decreases, and the hydraulic load on the main pump 14 also decreases. As the hydraulic load decreases, the engine load also decreases, so that the fuel consumption amount also decreases as indicated by the solid line in FIG. 9 (*d*), and the boost pressure also decreases as indicated by the solid line in FIG. 9 (*e*).

A decrease in the hydraulic load can also occur when the arm closing operation is continued. For example, when the arm 5 is to be removed from the ground by the closing operation of the arm 5, the excavation reaction force decreases, and, after the arm 5 is moved to the air, the excavation reaction force disappears.

After that, at the time t7, the operator operates the boom operating lever toward the raising direction so as to perform the raising operation of the boom 4. The lever operation amount of the boom operating lever starts to increase at the time t7, as indicated by the solid line in FIG. 9 (*a*), and reaches the maximum value at the time t8.

Upon detecting that the boom operating lever is operated toward the raising direction, the preload boost necessity determination unit 32 determines whether the bucket pin position P3 output from the attachment position retrieval unit 31 is within the actual work range WA1 (cf. FIG. 8). In the embodiment, upon detecting that the boom operating lever is operated toward the raising direction, the preload boost necessity determination unit 32 determines whether the bucket pin position P3 is within the actual work range WA1 (cf. FIG. 8), regardless of whether the arm closing operation is continued. The reason is that, as described above, even if the arm closing operation is continued, the hydraulic load may decrease. Thus, the preload boost may be executed, not only when the boom raising operation is performed alone, but also when a combined operation including the arm closing operation and the boom raising operation is performed. The same applied to a case where a combined operation including the bucket closing operation and the boom raising operation is performed. However, when the discharge pressure of main pump 14 is higher than or equal to a predetermined pressure, the preload boost necessity determination unit 32 may omit this determination. Namely, execution of the preload boost may be omitted. The reason is that the boost pressure is estimated to be already sufficiently high.

Then, upon detecting that the bucket pin position P3 is within the actual work range WA1, the preload boost necessity determination unit 32 determines that execution of the preload boost function is required, and immediately causes the motor generator 12 to perform a power generation operation. The time interval for causing the motor generator 12 to perform the power generation operation may be a short time interval, such as approximately 0.1 seconds. The motor generator 12 is driven by the engine 111 to perform the power generation operation, so that a load is applied to the engine 11 due to the power generation operation. As a result, as indicated by the solid line in FIG. 9 (*f*), the number of revolutions of the engine starts to decrease from the time t7.

Upon detecting that the number of revolutions of the engine starts to decrease, the controller 30 increases the fuel injection amount by the isochronous control to increase the number of revolutions of the engine. In the embodiment, the controller 30 stops decreasing the fuel consumption amount as indicated by the solid line in FIG. 9 (*d*). Depending on necessity, the fuel consumption amount may be increased. However, the timer interval for causing the motor generator 12 to perform the power generation operation is a short time interval, and the power generation amount is set to be small. Consequently, though the number of revolutions of the engine starts to decrease at the time t7 as indicated by the solid line in FIG. 9 (*f*), it immediately starts to increase and returns to the predetermined number of revolutions Nc again. The number of revolutions of the engine returns to the predetermined number of revolutions Nc, so that the fuel consumption amount restarts to decrease, as indicated by the solid line in FIG. 9 (*d*).

In this manner, similar to the case where the arm closing operation is performed, the controller 30 causes the motor generator 12 to perform the power generation operation for a short time interval in response to the raising operation of the boom operating lever so as to apply the load to the engine 11. As a result, as indicated by the solid line in FIG. 9 (*e*), it is possible to start increasing the boost pressure prior to the start of increasing the hydraulic load. Namely, an increase in the hydraulic load on the main pump 14 is predicted based on the lever operation amount of the arm operating lever so as to cause the motor generator 12 to perform the power generation operation. In this manner, prior to actually increasing the hydraulic load, the power generation load on the motor generator 12 can be increased so as to apply the load to the engine 11. The reason for applying the load to the engine 11 is to increase, in advance, the boost pressure of the engine 11 prior to the increase in the hydraulic load, so that an increase in the engine load caused by the increase in the hydraulic load can be quickly responded.

After the time t8, the hydraulic load increases and the engine load also increases. Then, at the time t9, the controller 30 outputs a command for increasing the fuel injection amount. As a result, as shown in FIG. 9 (*d*), the fuel consumption amount gradually increases. The increased amount of the fuel consumption amount at this time corresponds to the increase in the hydraulic load. Namely, the number of revolutions of the engine has already reached the predetermined number of revolution Nc, so that it is not necessary to consume the fuel to increase the number of revolutions of the engine. At time t9, the boost pressure has already increased to the predetermined value, so that, even if the hydraulic load increases, the engine 11 can efficiently increase the output, and an increase in the fuel consumption amount can be suppressed. This effect is indicated as a difference between the one dot chain line (the transition when the preload boost is not executed) and the solid line (the transition when the preload boost is executed) from the time t9 to the time t11 in FIG. 9 (*d*).

In this manner, the controller 30 predicts an increase in the hydraulic load based on the operation of the operating lever, and causes the power generation load on the motor generator 12 to be increased prior to increasing the hydraulic load. As a result, when the engine load actually increases, the controller 30 causes the number of revolutions of the engine to be the predetermined number of revolution Nc, and causes the boost pressure of the engine 11 to be increased. Namely, the boost pressure of the engine 11 can be prevented from becoming lower than the predetermined value. Accordingly, the number of revolutions of the engine may not be significantly decreased, so that fuel for increasing the number of revolutions of the engine may not be consumed. Usually, the power generation load on the motor generator 12 is increased when a charge level of the capacitor 19 is lowered; however, in the embodiment, even if there is no power generation request from the electric load, the electric power generation amount of the motor generator 12 is increased to control driving of the engine 11.

The description related to FIG. 9 is applied to a case where the boom raising operation is performed after the combined operation including the arm closing operation and the bucket closing operation is performed; however, it can also be applied to a case where the boom raising operation is performed after the arm closing operation is performed alone. Furthermore, it can also be applied to a case where the boom raising operation is performed after the bucket closing operation is performed alone.

The present invention is not limited to the specifically disclosed embodiment using the above-described shovel as an example, and various variations and modifications may be made without departing from the scope of the present invention.

What is claimed is:

1. A shovel comprising:
an attachment including a working assembly;
a diesel engine provided with a supercharger;
an oil hydraulic pump connected to the diesel engine provided with the supercharger; and
a controller that executes a preload boost function, wherein the preload boost function is for increasing boost pressure of the supercharger prior to increasing a hydraulic pressure load on the oil hydraulic pump,
wherein a range accessible by a predetermined part of the attachment includes a partial range at which, upon the working assembly being operated, the preload boost function is to be executed and a partial range at which, upon the working assembly being operated, the preload boost function is not to be executed.

2. The shovel according to claim 1, wherein the controller causes an absolute value of an increase in the boost pressure to be decreased, the increase in the boost pressure being achieved by execution of the preload boost function, as a position of the predetermined part of the attachment is more separated from a reference position or a reference range.

3. The shovel according to claim 1, wherein the controller causes an absolute value of an increase in a load on the diesel engine provided with the supercharger to be decreased, the increase in the load on the diesel engine being achieved by execution of the preload boost function, as a position of the predetermined part of the attachment is more separated from a reference position or a reference range.

4. The shovel according to claim 2, wherein the controller causes the absolute value of the increase in the boost pressure to be decreased, the increase in the boost pressure being achieved by the execution of the preload boost function, as a height of the predetermined part of the attachment becomes higher than the reference position, as a depth of the predetermined part of the attachment becomes deeper than the reference position, or as a reach of the attachment becomes longer.

5. The shovel according to claim 1, further comprising:
a motor generator connected to the diesel engine provided with the supercharger,
wherein the controller causes an electric power generation amount generated by the motor generator to be increased so as to increase the boost pressure of the supercharger, prior to increasing the hydraulic pressure load on the oil hydraulic pump.

6. The shovel according to claim 1, further comprising:
an orientation detector that detects an orientation of the attachment,
wherein the controller obtains information about a position of the predetermined part of the attachment based on an output of the orientation detector.

7. The shovel according to claim 1, wherein the partial range at which, upon the working assembly being operated, the preload boost function is not to be executed is located adjacent to at least one of an upper part, a lower part, and a distant part of the partial range at which, upon the working assembly being operated, the preload boost function is to be executed.

8. The shovel according to claim 1, wherein the partial range at which, upon the working assembly being operated, the preload boost function is to be executed is closer to the shovel compared to the partial range at which, upon the working assembly being operated, the preload boost function is not to be executed.

9. The shovel according to claim 8, wherein another partial range at which, upon the working assembly being operated, the preload boost function is not to be executed is located at a position closer to the shovel, compared to the partial range at which, upon the working assembly being operated, the preload boost function is to be executed.

10. The shovel according to claim 1, wherein the working assembly is operated when a boom raising operation is performed, when an arm closing operation is performed, or when a bucket closing operation is performed.

* * * * *